United States Patent
Li

(10) Patent No.: US 10,382,476 B1
(45) Date of Patent: Aug. 13, 2019

(54) NETWORK SECURITY SYSTEM INCORPORATING ASSESSMENT OF ALTERNATIVE MOBILE APPLICATION MARKET SITES

(71) Applicant: EMC Corporation, Hopkinton, MA (US)

(72) Inventor: Zhou Li, Malden, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 262 days.

(21) Appl. No.: 14/671,318

(22) Filed: Mar. 27, 2015

(51) Int. Cl.
*H04L 29/06* (2006.01)
*G06F 16/951* (2019.01)

(52) U.S. Cl.
CPC .......... *H04L 63/145* (2013.01); *G06F 16/951* (2019.01); *H04L 63/10* (2013.01)

(58) Field of Classification Search
CPC ....... H04L 63/10; H04L 63/20; H04L 63/145; H04L 63/1441
USPC ...................................... 726/22, 25
See application file for complete search history.

(56) References Cited

U.S. PATENT DOCUMENTS

| | | | | |
|---|---|---|---|---|
| 6,356,908 B1 * | 3/2002 | Brown | ............... | G06F 17/30899 |
| 7,562,304 B2 * | 7/2009 | Dixon | ............... | G06F 17/30861 |
| | | | | 705/35 |
| 8,234,266 B2 * | 7/2012 | Strohm | ............. | G06F 17/30864 |
| | | | | 707/709 |
| 8,244,752 B2 * | 8/2012 | Buehrer | ................... | H04L 47/10 |
| | | | | 707/769 |
| 8,683,584 B1 * | 3/2014 | Daswani | ............... | G06F 21/577 |
| | | | | 726/22 |
| 8,745,733 B2 * | 6/2014 | Niemela | ............... | G06F 21/554 |
| | | | | 726/22 |
| 8,818,349 B2 * | 8/2014 | Klassen | ................ | H04W 76/45 |
| | | | | 455/419 |

(Continued)

OTHER PUBLICATIONS

Alexa, "Top Sites by Category," http://www.alexa.com/topsites/category, 2014, 3 pages.

(Continued)

*Primary Examiner* — Yin Chen Shaw
*Assistant Examiner* — Carlos E Amorin
(74) *Attorney, Agent, or Firm* — Ryan, Mason & Lewis, LLP

(57) ABSTRACT

A processing device comprises a processor coupled to a memory and is configured to identify a plurality of mobile application market sites accessible over a network, and to extract features from each of the mobile application market sites. Health scores are computed for respective ones of the mobile application market sites based on the corresponding features extracted from those mobile application market sites. One or more proactive measures are initiated to prevent one or more mobile devices from downloading mobile applications from any of the mobile application market sites having computed health scores below a specified threshold. The mobile application market sites may be identified as respective alternative mobile application market sites relative to a known primary mobile application market site. The alternative mobile application market sites may comprise respective alternative mobile application stores. The processing device may be implemented in a computer network or an associated network security system.

20 Claims, 3 Drawing Sheets

(56) References Cited

U.S. PATENT DOCUMENTS

| | | | | |
|---|---|---|---|---|
| 9,152,694 | B1* | 10/2015 | Padidar | G06F 17/30598 |
| 9,298,928 | B2* | 3/2016 | Borghetti | G06F 21/577 |
| 10,049,222 | B1* | 8/2018 | Allen | G06F 21/6245 |
| 2003/0079179 | A1* | 4/2003 | Brown | G06F 17/30864 715/205 |
| 2005/0005160 | A1* | 1/2005 | Bates | G06F 21/56 726/24 |
| 2005/0216829 | A1* | 9/2005 | Kalinichenko | G06F 17/30371 715/205 |
| 2006/0075494 | A1* | 4/2006 | Bertman | G06F 21/552 726/22 |
| 2006/0253581 | A1* | 11/2006 | Dixon | G06F 17/30861 709/225 |
| 2007/0067682 | A1* | 3/2007 | Fang | G06F 21/565 714/100 |
| 2010/0005291 | A1* | 1/2010 | Hulten | G06F 21/51 713/156 |
| 2010/0186088 | A1* | 7/2010 | Banerjee | G06F 21/51 726/23 |
| 2010/0192196 | A1* | 7/2010 | Lee | G06F 21/55 726/1 |
| 2012/0102545 | A1* | 4/2012 | Carter, III | G06F 17/30864 726/3 |
| 2012/0240236 | A1* | 9/2012 | Wyatt | G06F 21/564 726/25 |
| 2013/0086682 | A1 | 4/2013 | Mahaffey et al. | |
| 2013/0191914 | A1* | 7/2013 | Dubrovsky | H04L 63/0245 726/22 |
| 2013/0247129 | A1* | 9/2013 | Heron | H04L 63/20 726/1 |
| 2013/0303118 | A1 | 11/2013 | Asandului et al. | |
| 2013/0347094 | A1* | 12/2013 | Bettini | H04L 63/0245 726/11 |
| 2014/0214610 | A1 | 7/2014 | Moshir et al. | |
| 2014/0230053 | A1* | 8/2014 | Mote | G06Q 30/0282 726/22 |
| 2015/0244820 | A1* | 8/2015 | Verkasalo | H04L 67/22 707/740 |
| 2015/0281258 | A1* | 10/2015 | Watkins | G06Q 30/0277 726/23 |
| 2016/0012220 | A1* | 1/2016 | Padidar | G06F 17/30598 726/22 |
| 2016/0099963 | A1* | 4/2016 | Mahaffey | H04L 63/0227 726/25 |
| 2016/0261715 | A1* | 9/2016 | Luria | H04L 67/02 |

OTHER PUBLICATIONS

Amazon, "Amazon.com: Apps & Games," http://www.amazon.com/mobile-apps/b?node=2350149011#, 2014, 6 pages.

Anzhi, "Anzhi App Market," http://www.anzhi.com/, 2014, 3 pages.

Appbrain, "Number of Android Applications," http://www.appbrain.com/stats/number-of-android-apps, 2014, 2 pages.

Billa, "17 Android App Store Alternatives for Those Who Hate Google Play," http://joyofandroid.com/24-android-app-store-alternatives-for-those-who-hate-google-play/, 2013, 31 pages.

Jon Fingas, "Android Tops 81 Percent of Smartphone Market Share in Q3," http://www.engadget.com/2013/10/31/strategy-analytics-q3-2013-phone-share/, Oct. 31, 2013, 6 pages.

Jeff Goldman, "Symantec Finds Malicious Porn Apps on Google Play," http://www.esecurityplanet.com/mobile-security/symantec-finds-malicious-porn-apps-on-google-play.html, Apr. 3, 2013, 2 pages.

Hiroshi Lockheimer, "Android and Security," http://googlemobile.blogspot.com/2012/02/android-and-security.html, Feb. 2, 2012, 8 pages.

M. Lindorfer et al., "AndRadar: Fast Discovery of Android Applications in Alternative Markets," Proceedings of the 11th International Conference on Detection of Intrusions and Malware, and Vulnerability Assessment (DIMVA), Lecture Notes in Computer Science, Jul. 2014, pp. 51-71, vol. 8550, Egham, United Kingdom.

Sophos, "Security Threat Report 2014," http://www.sophos.com/en-us/medialibrary/PDFs/other/sophos-security-threat-report-2014.pdf, 2014, 34 pages.

T. Vidas et al., "Sweetening Android Lemon Markets: Measuring and Combating Malware in Application Marketplaces," Proceedings of the Third ACM Conference on Data and Application Security and Privacy (CODASPY), Feb. 2013, pp. 197-208.

W. Zhou et al., "Detecting Repackaged Smartphone Applications in Third-Party Android Marketplaces," Proceedings of the Second ACM Conference on Data and Application Security and Privacy (CODASPY), Feb. 2012, pp. 317-326.

Y. Zhou et al., "Hey, You, Get Off of My Market: Detecting Malicious Apps in Official and Alternative Android Markets," 19th Annual Network & Distributed System Security Symposium (NDSS), Feb. 2012, 13 pages.

S. Chakradeo et al., "MAST: Triage for Market-Scale Mobile Malware Analysis," Proceedings of the Sixth ACM Conference on Security and Privacy in Wireless and Mobile Networks (WiSec), Apr. 2013, pp. 13-24, Budapest, Hungary.

P.H. Chia et al., "Is This App Safe? A Large Scale Study on Application Permissions and Risk Signals," Proceedings of the 21st International Conference on World Wide Web (WWW), Apr. 2012, pp. 311-320, Lyon, France.

P. Gilbert et al., "Vision: Automated Security Validation of Mobile Apps at App Markets," Procedings of the Second International Workshop on Mobile Cloud Computing and Services (MCS), Jun. 2011, pp. 21-26.

M. Grace et al., "RiskRanker: Scalable and Accurate Zero-Day Android Malware Detection," Proceedings of the 10th International Conference on Mobile Systems, Applications, and Services (MobiSys), Jun. 2012, pp. 281-294, Low Wood Bay, Lake District, United Kingdom.

M.D. Ernst et al., "Collaborative Verification of Information Flow for a High-Assurance App Store," Proceedings of the 21st ACM Conference on Computer and Communications Security (CCS), Nov. 2014, pp. 1092-1104.

Y. Zhou et al., "Dissecting Android Malware: Characterization and Evolution," IEEE Symposium on Security and Privacy (SP), May 2012, pp. 95-109.

* cited by examiner

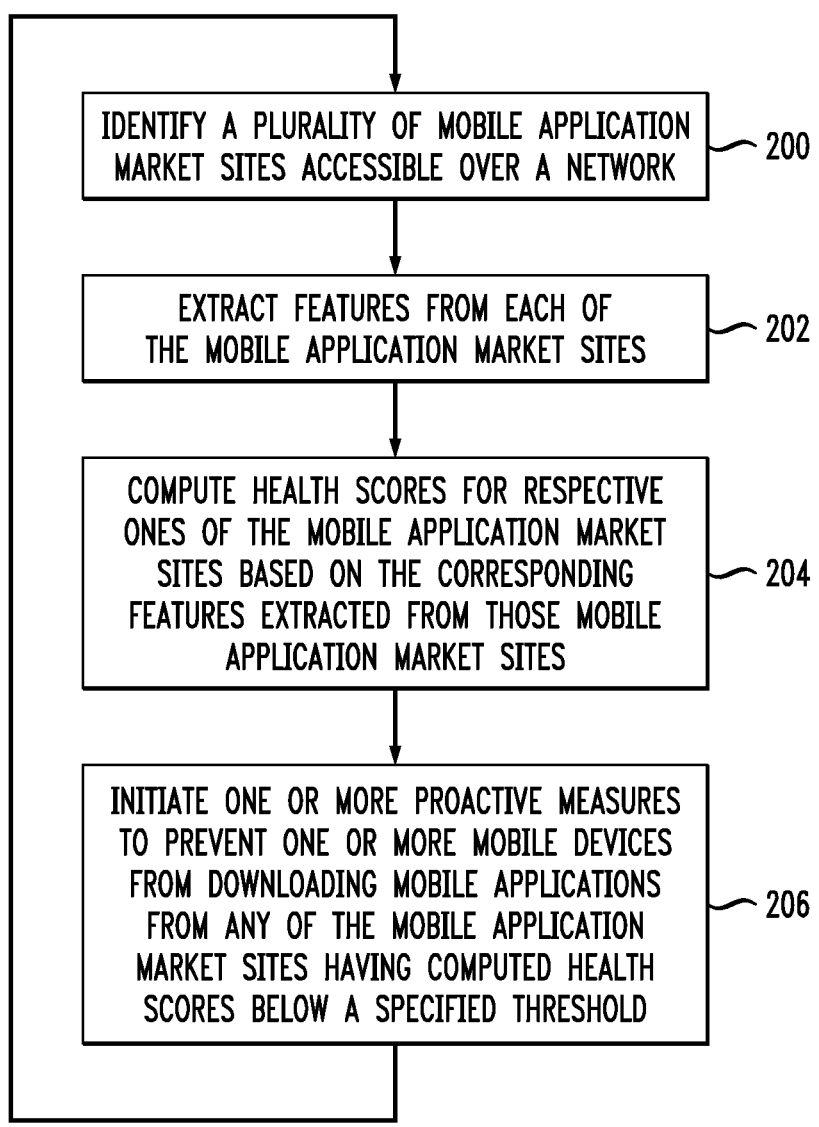

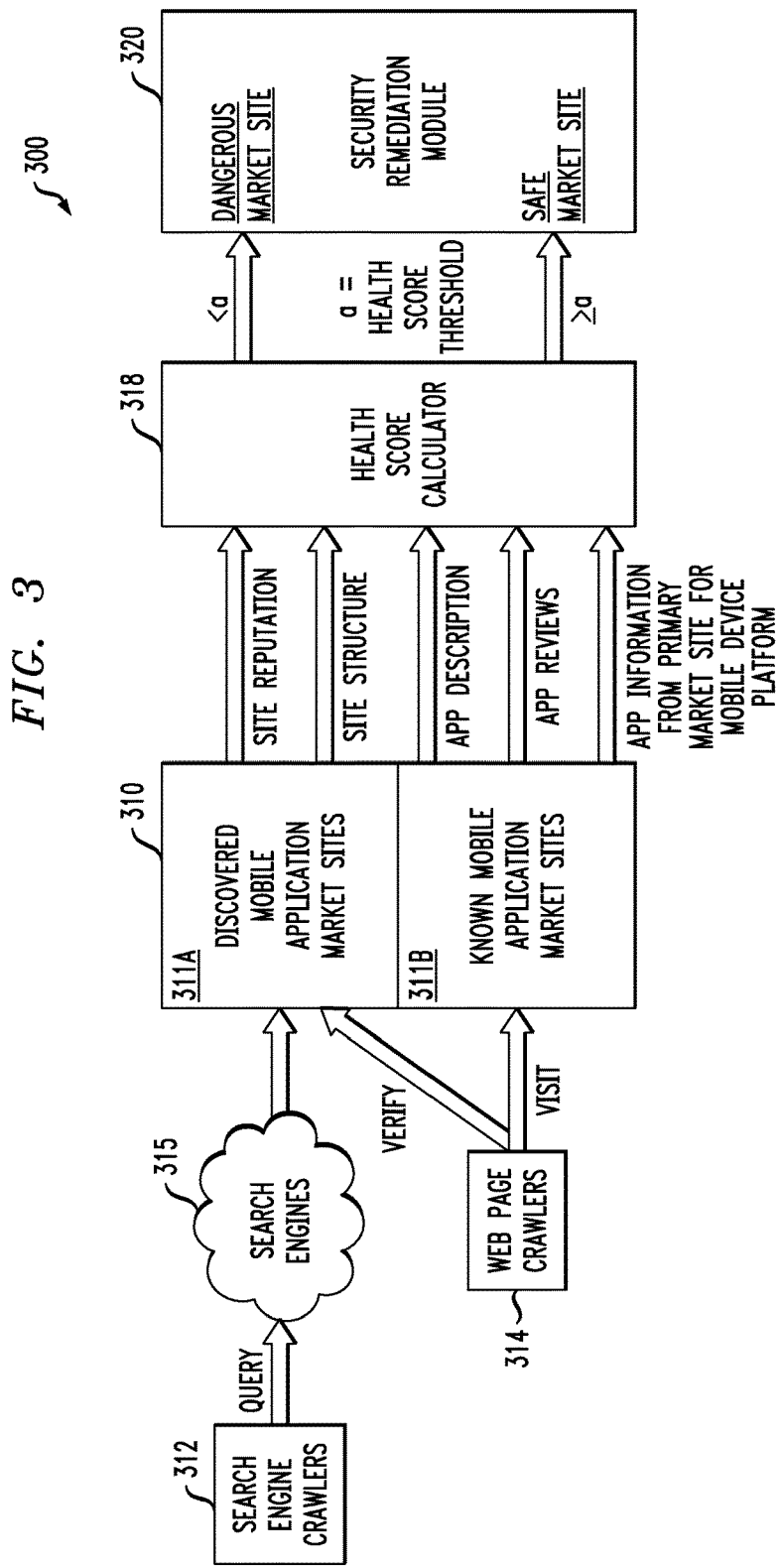

NETWORK SECURITY SYSTEM INCORPORATING ASSESSMENT OF ALTERNATIVE MOBILE APPLICATION MARKET SITES

FIELD

The field relates generally to computer networks, and more particularly to techniques for providing security in a computer network.

BACKGROUND

Computer networks are often configured to incorporate network security systems in order to protect the networks against malicious activity. Such malicious activity can include, for example, deployment of malware that is utilized by attackers to create networks of compromised devices or "botnets."

An increasingly significant source of malware involves malicious mobile applications downloaded from alternative mobile application market sites. Although some highly respected mobile application market sites can be relied upon to individually scan all of their available mobile applications for malware prior to offering any of those mobile applications for download to the mobile devices of their users, there are numerous alternative market sites offering similar mobile applications that may include malware.

Conventional approaches to assessing alternative market sites generally require downloading and scanning all or nearly all of the mobile applications available at each such market site. Such approaches are unduly time-consuming and are not readily scalable to the increasingly large numbers of alternative market sites accessible to mobile device users. Accordingly, there is a high likelihood that mobile applications downloaded from alternative market sites contain malware.

SUMMARY

Illustrative embodiments of the invention advantageously provide techniques for accurate and efficient assessment of alternative mobile application market sites. Such assessment can be utilized, for example, in a network security system to prevent download of applications from mobile application market sites that are determined to have health scores below a specified threshold, where the health score for a given one of the mobile application market sites provides an estimate of the likelihood that the given mobile application market site is a source of malware. One or more other proactive measures can additionally or alternatively be taken by the network security system based on the computed health scores to improve security and performance in a computer network.

In one embodiment, a processing device comprises a processor coupled to a memory and is configured to identify a plurality of mobile application market sites accessible over a network, and to extract features from each of the mobile application market sites. The mobile application market sites may comprise, for example, respective mobile application stores or other types of market sites. Health scores are computed for respective ones of the mobile application market sites based on the corresponding features extracted from those mobile application market sites. One or more proactive measures are initiated to prevent one or more mobile devices from downloading mobile applications from any of the mobile application market sites having computed health scores below a specified threshold.

The mobile application market sites may be identified as respective alternative mobile application market sites relative to a known primary mobile application market site. Accordingly, identification of mobile application market sites in some embodiments comprises determining a primary mobile application market site associated with a given mobile device platform, and identifying the plurality of mobile application market sites as respective alternative mobile application market sites for the primary mobile application market site associated with the given mobile device platform. By way of example, the given mobile device platform may comprise an Android mobile device platform and the primary mobile application market site may comprise a Google Play market site.

In some embodiments, features are extracted from at least a given one of the mobile application market sites without separately scanning code of individual mobile applications available from the given mobile application market site.

Additionally or alternatively, features are extracted from at least the given one of the mobile application market sites without requiring cooperation from any owner of the given mobile application market site.

Accordingly, in some embodiments the computed health score for a given one of the mobile application market sites characterizes the given mobile application market site as a whole and does not characterize any particular individual mobile application available from that mobile application market site.

Illustrative embodiments of the invention advantageously provide mobile application market site assessment techniques that are particularly efficient and easy to implement. For example, these techniques in certain embodiments are "lightweight" in that they generally do not require substantial computational or storage resources for their implementation. This is due at least in part to some embodiments being configured to avoid scanning code of individual applications from a given mobile application market site, but instead assessing the overall health of the given mobile application market site in terms of likelihood that the site is a source for malicious mobile applications.

One or more of these embodiments therefore incur much less processing overhead than conventional approaches and as a result can be used to effectively monitor a large spectrum of alternative market sites.

Moreover, deployment of the disclosed market site assessment techniques greatly reduces the likelihood that users will download malicious mobile applications from alternative market sites.

A given processing device configured with functionality for assessment of alternative mobile application market sites may be implemented, for example, in one or more network devices of a computer network, or in a security analytics system or other type of network security system associated with the computer network.

These and other illustrative embodiments include, without limitation, methods, apparatus, networks, systems and processor-readable storage media.

BRIEF DESCRIPTION OF THE DRAWINGS

FIG. 2 is a flow diagram of an example process for assessment of alternative mobile application market sites in the computer network of FIG. 1.

FIG. 3 shows another illustrative embodiment of a computer network configured with functionality for assessment of alternative mobile application market sites.

DETAILED DESCRIPTION

Figure 1:
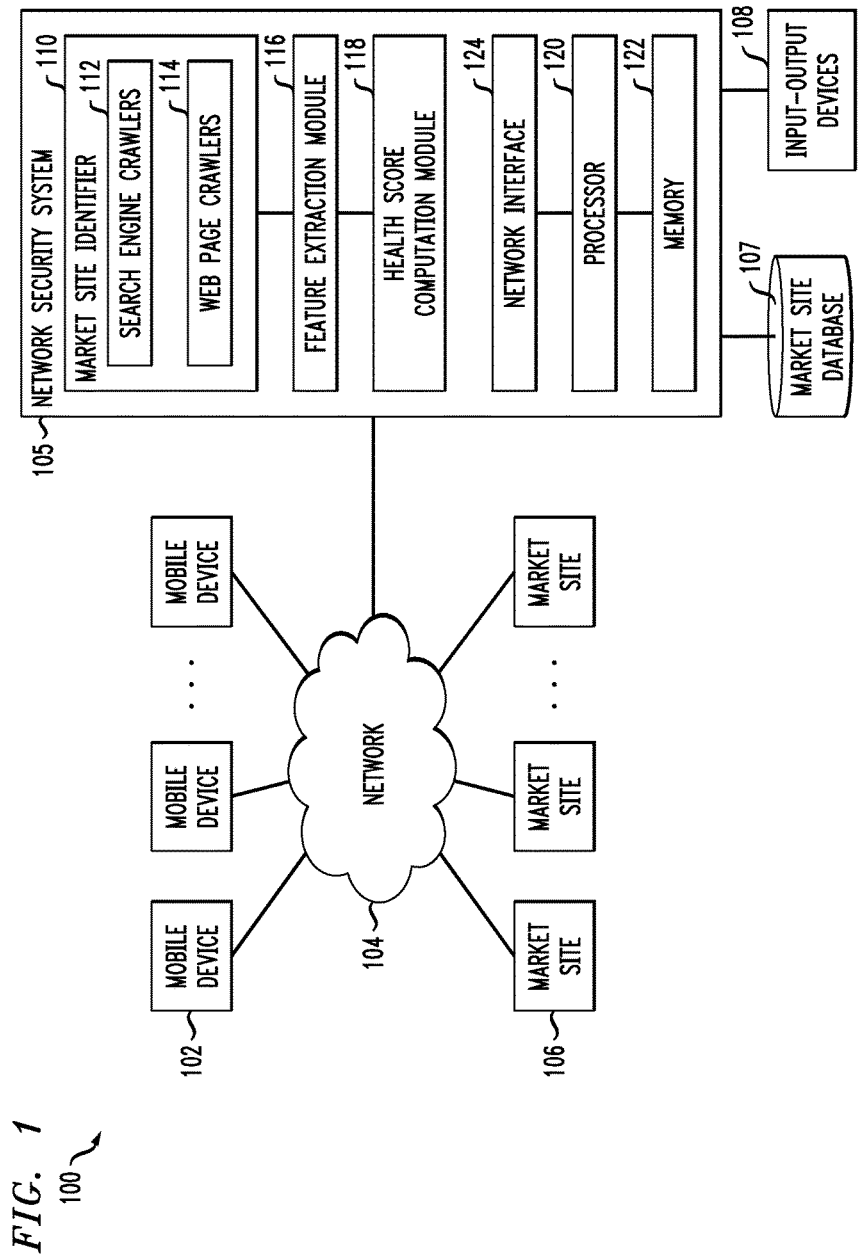
FIG. 1 shows a computer network configured with functionality for assessment of alternative mobile application market sites in an illustrative embodiment of the invention.

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

FIG. 1 shows a computer network 100 configured in accordance with an illustrative embodiment of the invention. The computer network 100 comprises a plurality of mobile devices 102. The mobile devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment.

The mobile devices 102 may comprise, for example, mobile telephones, tablet computers, laptop computers or other types of mobile devices, in any combination. Such devices are examples of what are more generally referred to herein as "processing devices."

The computer network 100 further comprises a network security system 105 coupled to the network 104. Also coupled to the network 104 are market sites 106. The market sites 106 illustratively comprise respective mobile application market sites from which the mobile devices 102 can download mobile applications. For example, the mobile application market sites may comprise respective mobile application stores, although other types of market sites can be used in other embodiments.

In some implementations, the mobile devices 102 are associated with respective users within a particular company, organization or other enterprise, and the network security system 105 is configured to protect the mobile devices 102 from malicious applications that may be available from one or more of the market sites 106. However, numerous other operating scenarios involving a wide variety of different types and arrangements of mobile devices, network security systems and market sites are possible, as will be appreciated by those skilled in the art. As one possible additional example, the mobile devices 102 can be associated with respective individual and geographically dispersed users not associated with any common enterprise, and such users can separately subscribe to or otherwise access network security functions available from the network security system 105.

The network 104 is assumed to comprise a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising network devices configured to communicate using IP or other related communication protocols.

The network security system 105 has an associated market site database 107 configured to store information characterizing at least a subset of the market sites 106. Such information illustratively comprises health scores computed by the network security system 105 for respective ones of the market sites 106.

The market site database 107 is implemented using one or more storage devices associated with the network security system 105. Such storage devices may comprise, for example, storage products such as VNX® and Symmetrix VMAX®, both commercially available from EMC Corporation of Hopkinton, Mass. A variety of other storage products may be utilized to implement at least a portion of the storage devices associated with the network security system 105.

Also associated with the network security system 105 are input-output devices 108, which illustratively comprise keyboards, displays or other types of input-output devices in any combination. Such input-output devices are used to support one or more user interfaces to the network security system 105, as well as to support communication between the network security system 105 and other related systems and devices not explicitly shown.

The network security system 105 further comprises a market site identifier 110 comprising search engine crawlers 112 and web page crawlers 114.

The mobile application market sites 106 may be identified as respective alternative mobile application market sites relative to a known primary mobile application market site. Accordingly, identification of mobile application market sites 106 in some embodiments comprises determining a primary mobile application market site associated with a given mobile device platform, and identifying the mobile application market sites 106 as respective alternative mobile application market sites for the primary mobile application market site associated with the given mobile device platform.

As one possible example, the mobile devices 102 in some embodiments are illustratively associated with an Android mobile device platform. In such an arrangement, the primary mobile application market site may comprise a Google Play market site. However, other embodiments can be implemented for numerous alternative mobile device platforms and associated primary mobile application market sites.

The primary mobile application market site for a given mobile device platform in the present embodiment is assumed to be a legitimate mobile application market site. Potentially problematic mobile application market sites are identified by the network security system 105 using its market site identifier 110.

The market site identifier 110 is more particularly configured to identify mobile application market sites accessible over the network 104. For example, the market site identifier 110 illustratively deploys multiple instances of the search engine crawlers 112 to access respective multiple search engines in order to determine a set of potential mobile application market sites. It also deploys multiple instances of the web page crawlers 114 to examine respective ones of the potential mobile application market sites to identify particular ones of the potential mobile application market sites that are actual mobile application market sites.

The mobile application market sites 106 in the FIG. 1 embodiment are assumed to be identified at least in part by the market site identifier 110 as a subset of the potential mobile application market sites determined by the search engine crawlers 112. The particular subset is illustratively determined based at least in part on outputs generated by respective ones of the web page crawlers 114. Other techniques can be used to identify potential or actual mobile application market sites in other embodiments.

Also included in the network security system 105 in the FIG. 1 embodiment is a feature extraction module 116 and a health score computation module 118.

The feature extraction module 116 is configured to extract features from each of the mobile application market sites identified by the market site identifier 110. This may include, for example, all or a subset of the market sites 106.

In some embodiments, features are extracted from at least a given one of the mobile application market sites without separately scanning code of individual mobile applications available from the given mobile application market site.

Additionally or alternatively, features are extracted from at least the given one of the mobile application market sites without requiring cooperation from any owner of the given mobile application market site.

The health score computation module 118 is configured to compute health scores for respective ones of the mobile application market sites based on the corresponding features extracted from those mobile application market sites.

Accordingly, in some embodiments the computed health score for a given one of the mobile application market sites characterizes the given mobile application market site as a whole and does not characterize any particular individual mobile application available from that mobile application market site.

The network security system 105 is assumed to be further configured to initiate one or more proactive measures to prevent one or more of the mobile devices 102 from downloading mobile applications from any of the mobile application market sites 106 having computed health scores below a specified threshold. Examples of such proactive measures will be described elsewhere herein.

It is to be appreciated that the particular arrangement of modules 110, 112, 114, 116 and 118 is presented by way of example only, and alternative arrangements can be used in other embodiments. For example, the functionality associated with the modules 110, 112, 114, 116 and 118 in other embodiments can be combined into a single module, or separated across a larger number of modules.

The network security system 105 in the FIG. 1 embodiment is assumed to be implemented using at least one processing device. Each such processing device generally comprises at least one processor and an associated memory, and implements one or more functional modules for controlling certain features of the network security system 105.

More particularly, the network security system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing program code of one or more software programs.

Articles of manufacture comprising such processor-readable storage media are considered embodiments of the present invention. A given such article of manufacture comprises, for example, a storage device such as a storage disk, a storage array or an integrated circuit containing memory. The term "article of manufacture" as used herein should be understood to exclude transitory, propagating signals.

The network interface 124 allows the network security system 105 to communicate over the network 104 with the mobile devices 102 and market sites 106, and illustratively comprises one or more conventional transceivers.

At least portions of one or more of the market site identifier 110, feature extraction module 116 and health score computation module 118 of the network security system 105 may be implemented at least in part in the form of software that is stored in memory 122 and executed by processor 120.

It is to be understood that the particular set of elements shown in FIG. 1 for assessing alternative mobile application market sites in computer network 100 and proactively addressing problematic mobile application market sites is presented by way of illustrative example only, and in other embodiments additional or alternative elements may be used. Thus, another embodiment may include additional or alternative systems, devices and other network entities, as well as different arrangements of modules and other components.

By way of example, in other embodiments, the network security system 105 can be eliminated and its associated modules 110, 116 and 118 can be implemented elsewhere in the computer network 100.

In some embodiments, the network security system 105 is a part of or otherwise associated with another system, such as, for example, a security operations center (SOC) or a critical incident response center (CIRC).

Additionally or alternatively, the network security system 105 can be part of or incorporate an otherwise conventional security analytics system, such as the RSA Security Analytics system commercially available from RSA, The Security Division of EMC Corporation of Hopkinton, Mass.

Other embodiments can implement the network security system 105 and its associated modules 110, 116 and 118 as part of or in conjunction with a security information and event management (SIEM) system, such as the enVision® platform, also commercially available from RSA. Such an SIEM system is also considered another possible example of a "network security system" as that term is broadly used herein. In an embodiment of this type, at least portions of the market site database 107 or other data storage arrangement illustratively comprises security logs collected by the SIEM system.

An exemplary process utilizing network security system 105 of computer network 100 will now be described in more detail with reference to the flow diagram of FIG. 2. It is to be understood that this particular process is only an example, and additional or alternative processes can be carried out in other embodiments.

In this embodiment, the process includes steps 200 through 206. Steps 200, 202 and 204 are assumed to be performed by respective ones of the market site identifier 110, feature extraction module 116 and health score computation module 118. Step 206 is an example of a proactive measure step assumed to be performed by other components of the network security system 105 not explicitly shown in FIG. 1. For example, such a step may be performed by a security remediation module implemented in a network security system or another entity within or associated with a computer network. One such arrangement will be described in more detail in conjunction with FIG. 3.

In step 200, a plurality of mobile application market sites accessible over a network are identified. For example, market site identifier 110 of network security system 105 identifies at least a subset of the market sites 106 as mobile application market sites by interacting with those sites over the network 104. This may more particularly involve determining a primary mobile application market site associated with a given mobile device platform, such as the Google Play market site associate with the Android platform, and identifying the mobile application market sites as respective alternative mobile application market sites for the primary mobile application market site associated with the given mobile device platform. Accordingly, in some embodiments the mobile application market sites identified in step 200 are respective alternative mobile application market sites.

In identifying the mobile application market sites in step 200, the network security system 105 illustratively deploys multiple search engine crawlers 112 of the market site identifier 110 to access respective distinct search engines in order to determine a set of potential mobile application market sites. For example, a given one of the search engine crawlers 112 can be configured to determine the set of potential mobile application market sites at least in part by identifying at least one web site that provides one or more download links for respective files having an application package suffix, such as a .apk suffix, or identifying at least one web site having a known application package name in its uniform resource locator (URL). Various combinations of these and other identification techniques can additionally or alternatively be used to identify potential mobile application market sites.

From the determined set of potential mobile application market sites, the network security system 105 via its market site identifier 110 identifies at least a subset of the potential mobile application market sites as comprising respective actual mobile application market sites. This illustratively involves deployment of multiple web page crawlers 114 to examine each of the potential mobile application market sites. Outputs of the web page crawlers 114 are utilized to determine which of the potential mobile application market sites constitute actual mobile application market sites.

For example, a given one of the web page crawlers 114 may examine a particular one of the potential mobile application market sites by traversing the site to a specified depth to check if one or more application packages are downloaded from the site in the course of the traversal to the specified depth.

In an arrangement of this type, it may be desirable for the network security system 105 to implement the web page crawlers 114 to mimic mobile devices. This will facilitate checking for downloading of application packages from any web sites that only permit downloading of application packages to mobile devices. More particularly, some mobile application market sites are configured to inhibit the delivery of applications to any requesting device that is not a mobile device. Accordingly, a given one of the web page crawlers 114 can mimic a mobile device by, for example, configuring its web requests to utilize a user-agent string of a type commonly associated with mobile device browsers.

The exemplary arrangement described above utilizes the search engine crawlers 112 and the web page crawlers 114 to implement respective steps of a two-step process in which the first step involves searching for potential mobile application market sites and the second step involves filtering the potential mobile application market sites to identify which of the potential mobile application market sites are actual mobile application market sites.

As a more particular example, a two-step mobile application market site identification process can include the following steps:

1. Searching for potential mobile application market sites. The search engine crawlers 112 are configured to utilize respective search engines to discover potential mobile application market sites. Specifically, the search engine crawlers 112 search general keywords related to markets (e.g., "Android market") or keywords related to popular applications (e.g., "Angry Birds") and store the returned results in the market site database 107 for further processing. Some market sites embed an application package name within a corresponding URL of a web page from which that application can be downloaded. For example, com.rovio.angrybirds, the package name of Angry Birds, is embedded in the corresponding web page URL by primary mobile application market site Google Play. Accordingly, the search engine crawlers 112 can be configured to search for URLs containing popular package names. For example, using inurl:com.rovio.angrybirds as a search term in one or more of the search engine crawlers 112 will reveal many market sites that potentially offer that mobile application for download. Additionally or alternatively, the search engine crawlers can leverage public web site categories to facilitate discovery of potential mobile application market sites.

2. Verification of actual mobile application market sites. This step filters out certain ones of the potential mobile application market sites that are not actual market sites. In the present example, it is assumed that an actual mobile application market site is one that is configured to deliver mobile applications. Accordingly, the web page crawlers 114 are configured to crawl the potential mobile application market sites to a certain depth and to determine if one or more application packages are downloaded in this process. As noted above, the application packages are identified by file names having a .apk suffix. The market site database 107 is then updated to reflect which of the potential mobile application market sites are identified as actual mobile application market sites.

In step 202, features are extracted from each of the mobile application market sites that were identified as actual mobile application market sites in step 200. By way of example, the feature extraction module 116 is illustratively configured to extract features from each of the actual mobile application market sites based at least in part on one or more of site reputation, site structure, application description, application reviews, and application information from a corresponding primary mobile application market site. Such features can be used to derive scores of overall market site health in a manner that advantageously avoids downloading and scanning a significant percentage of the hosted mobile applications of the given mobile application market site. The features can be extracted using web page crawling, relatively simple content analysis or other "lightweight" techniques not involving use of substantial computational or storage resources. Accordingly, the corresponding assessment processes are readily scalable to large numbers of alternative mobile application market sites.

The above-noted example features that may be extracted from one or more alternative mobile application market sites are more particularly described as follows:

1. Site reputation. The site reputation for a given one of the mobile application market sites may be estimated from one or more of level of incoming web traffic, length of registration period and appearance on at least one blacklist. Market sites with high levels of site reputation usually invest more on security defenses to keep their properties safe and protect their clients. While the site reputation is not directly retrievable, it can be estimated by combining various types of publicly-available information. For example, a highly reputable market site will typically have high levels of incoming web traffic, will be registered for a long period of time, and will rarely appear on any known blacklist. Such information can be separately queried from multiple sources including Alexa rankings, "whois" servers, and security services such as Google Safebrowsing and VirusTotal.

2. Site structure. The site structure for a given one of the mobile application market sites can be estimated from number and type of advertisements or inappropriate content, number and type of pop-up windows, and amount and type of hidden content. For example, a legitimate application market site will typically be dedicated to delivery of mobile applications and will contain only limited irrelevant content. Accordingly, a market site displaying advertisements or inappropriate content excessively, showing pop-up windows and embedding hidden content for "black hat" search engine optimization and other purposes is usually of low quality and likely to be, for example, a malicious market site or another type of unhealthy market site that is likely to be a source for malware.

3. Application description. The application description for a given one of the mobile application market sites can be determined by applying natural language processing (NLP) to descriptions of respective applications available from the given mobile application market site in order to detect the presence of predetermined types of known problematic content. For example, certain types of offensive or inappropriate content such as pornography or gambling-related content are often used by attackers to lure visitors into downloading malicious applications. Accordingly, NLP techniques are leveraged to analyze descriptions from market site web pages to detect the presence of problematic content. High levels of such content are associated with unhealthy market sites.

4. Application reviews. The application reviews for a given one of the mobile application market sites are analyzed to determine if more than a threshold percentage of the application reviews are fake reviews. Mobile application market sites commonly allow users to post reviews and ratings for applications which are publicly available. Applications with good reviews and high ratings are more likely to be downloaded by users. Unfortunately, this feature is abused by attackers who falsely boost the reviews and ratings of their malicious applications. In fact, there exist specialized companies which hire people or use bots for this purpose. The resulting fake reviews and ratings usually exhibit patterns different from those of normal users and can be identified through techniques used for spam detection. If a large number of applications from a given market site are boosted through fake reviews and ratings, this is taken as an indication of a malicious or otherwise unhealthy market site.

5. Application information from a primary market site. The application information from a primary market site for a given mobile device platform, such as the Google Play market site for the Android platform, can be leveraged as a feature in computation of the health score. For example, such application information can include identification of any mobile applications available from a given alternative mobile application market site that are flagged as problematic on the primary mobile application market site. As a more particular example, consider a mobile application that is initially made available on the Google Play primary market site and from one or more alternative market sites in order to increase audience coverage. Google Play is typically more secure and responsible than other market sites and therefore in this feature it is used as an "oracle" to determine the quality of applications hosted by the alternative market sites. For example, if an application is flagged or rated poorly in Google Play, an alternative market site offering that application can be considered to have low quality. A healthy alternative market site should be able to clean up such applications in a timely manner or otherwise prevent them from being uploaded in the first place.

It should be appreciated that the above-noted extracted features are presented by way of example only, and additional or alternative sets of features may be extracted by the feature extraction module 116 in other embodiments.

In addition, terms such as "extracting features" as used herein are intended to be broadly construed to encompass a wide variety of different techniques for determining particular characteristics of mobile application market sites.

As indicated previously, the example features in some embodiments can be extracted without separately scanning code of individual mobile applications available from the given mobile application market site. Moreover, such features can be generally be extracted from a given one of the mobile application market sites without requiring cooperation from any owner of the given mobile application market site.

In step 204, health scores are computed for respective ones of the mobile application market sites based on the corresponding features extracted from those mobile application market sites in step 202.

The computation of the health scores may involve, for example, generating a logistic regression model, and applying the extracted features for a given one of the mobile application market sites to the logistic regression model to generate the health score for the given mobile application market site.

The logistic regression model is a statistical model that predicts an outcome based on a given set of feature values. The particular parameters for the model can be derived at least in part from a training data set relating to a relatively small number of market sites that have been previously analyzed. For example, the relevant features can be extracted from each such market site. The mobile applications hosted by that market site are scanned, and a health score for the site is computed as the percentage of malicious applications relative to the total number of applications hosted by the market site. The trained model can then be used to generate a health score for any market site to be evaluated, without the need for scanning any of the mobile applications hosted by that market site.

The application scanning is used only for building the training data set, which need only be done once and for a small number of markets. Application scanning is not used to generate health scores for market sites using the trained model.

In the present embodiment, it is assumed that the computed health score for the given mobile application market site characterizes the given mobile application market site as a whole and does not characterize any particular individual mobile application available from that mobile application market site.

It should be noted that the logistic regression model generally incorporates multiple ones of the extracted features described previously. Typically, malicious market sites behave differently than legitimate market sites on each of these features, but relying on a single feature could lead to inaccurate estimation. For example, relatively new market sites are likely to have low site reputation but may nonetheless be legitimate market sites. Accordingly, the logistic regression model in the present embodiment collectively considers multiple distinct extracted features in computing the health scores.

As noted above, the logistic regression model used in a given embodiment can be determined based on actual mobile application market site data obtained from known legitimate and malicious market sites and stored in the market site database 107 as part of the above-noted training data set. For example, the particular features determined to be statistically significant may vary depending upon the characteristics of the known legitimate and malicious market sites of the training data set. Also, the model can be updated over time to reflect additional or alternative features associated with particular ones of the market sites 106 that are definitely determined to be legitimate or malicious. This allows the model to be "tuned" over time to reflect variations in security conditions in the computer network 100.

By way of example, the health score computation may produce health scores ranging from zero to one, with zero indicating a very malicious market site and one indicating a very healthy market site. If a given market site is around the median value of 0.5 in this example, then it is unclear if the market site is malicious or healthy and therefore additional information can be collected from that market site and the score adjusted accordingly. For example, an additional web page crawler can be deployed to selectively download applications from the market site in question and scan them using an existing application analysis tool. The particular applications selected for downloading and scanning should cover a variety of different categories (e.g., games, news, music) and different ratings. The health score can then be adjusted based on the percentage of detected malicious applications. Moreover, the adjusted health score and the corresponding features of the market site in question can be used as additional training data for updating of the logistic regression model. It is expected that only relatively few market sites will fall into this indeterminate category.

A given logistic regression model utilized by the health score computation module 118 can be generated in that module, or in another portion or portions of the network security system 105 or computer network 100. It is also possible for the logistic regression model or portions thereof to be generated in an entirely separate system and downloaded into or otherwise provided to the health score computation module 118.

Also, embodiments of the invention are not limited to utilizing logistic regression models, and accordingly the logistic regression model mentioned above may be replaced in other embodiments with a linear model, a Poisson model or a Bayesian model.

In step 206, one or more proactive measures are initiated by the network security system 105 to prevent one or more of the mobile devices 102 from downloading mobile applications from any of the mobile application market sites having computed health scores below a specified threshold.

For example, proactive measures initiated by the network security system 105 can include adding a given mobile application market site having a computed health score below the specified threshold to at least one blacklist, blocking access to the given mobile application market site, redirecting mobile device requests from the given mobile application market site to one or more other mobile application market sites having computed health scores at or above the specified threshold, and identifying applications available from the given mobile application market site as malicious applications.

Accordingly, security companies can add the URLs of market sites with low health scores into their blacklists such that their customers will be prevented from visiting those market sites, or enterprises can set up policies blocking user access to the malicious market sites or suggesting alternative market sites. Anti-virus programs implemented by the network security system 105 or individually by the mobile devices 102 can utilize the computed health scores to determine if applications downloaded from a given alternative market site should be installed. The anti-virus programs can access network logs or browsing history to identify particular alternative market sites used by a given mobile device.

The above are only examples of some types of proactive measures that can be taken based on health scores generated for respective alternative market sites, and numerous other types of proactive measures can be taken in other embodiments.

Moreover, other arrangements can be used to trigger one or more additional or alternative proactive measures based at least in part on mobile application market site health scores determined in the manner described herein.

Additional instances of steps 200 through 206 can be performed on a regular basis or otherwise repeated periodically in order to ensure that malicious market sites continue to be identified and appropriate proactive measures initiated.

Numerous other techniques can be used to assess alternative mobile application market sites and take appropriate proactive measures in other embodiments.

Accordingly, the particular processing operations and other network functionality described in conjunction with the flow diagram of FIG. 2 are presented by way of illustrative example only, and should not be construed as limiting the scope of the invention in any way. Alternative embodiments can use other types of processing operations to assess alternative mobile application market sites and to take appropriate proactive measures to prevent mobile devices from downloading applications from those sites. For example, the ordering of the process steps may be varied in other embodiments, or certain steps may be performed concurrently with one another rather than serially. Also, as indicated previously, the process steps or subsets thereof may be repeated periodically in conjunction with respective distinct instances of mobile application market site assessment.

Another illustrative embodiment is shown in FIG. 3. In this embodiment, a computer network 300 comprises at least one processing device 310 that implements functionality for market site identification and feature extraction. The processing device 310 separates mobile application market sites into discovered mobile application market sites 311A and known mobile application market sites 311B.

The discovered mobile application market sites 311A are determined at least in part by applying search engine crawlers 312 to search engines 315. The computer network 300 also deploys web page crawlers 314 to verify particular ones of the discovered mobile application market sites 311A and to visit particular ones of the known mobile application market sites 311B. The processing device 310 extracts features from each of at least a subset of those discovered and known mobile application market sites that are identified as respective alternative mobile application market sites relative to a primary mobile application market site for a given mobile device platform.

The extracted features in this embodiment are assumed to include the previously-described features of site reputation, site structure, application description, application reviews and application information from the primary mobile application market site for the mobile device platform at issue, illustratively the Google Play market site for the Android mobile platform, although other features, mobile platforms and primary market sites can be used in other embodiments.

A health score calculator 318 receives the extracted features for a given identified alternative mobile application market site, and applies the previously-described logistic regression model to generate a health score for the given site.

The resulting health score is provided to a security remediation module 320 that separates alternative mobile application market sites into malicious or "dangerous" market sites and legitimate or "safe" market sites. This involves comparing the health score for a given market site to a specified threshold a. Alternative mobile application market sites with scores below the threshold a are considered dangerous, while those with scores at or above the threshold a are considered safe.

After making this determination based on the health scores computed by the health score calculator 318, the security remediation module 320 takes one or more proactive measures to prevent mobile devices from downloading mobile applications from the dangerous market site. For example, as indicated previously, the security remediation module 320 can cause the dangerous market site to be blacklisted, or can block the mobile devices from accessing that market site or can redirect the mobile devices to other market sites with health scores at or above the threshold. Such proactive measures can illustratively involve adjustments to parameters and other settings of anti-virus programs deployed for the protection of mobile devices in the computer network 300.

Like the embodiments of FIGS. 1 and 2, the FIG. 3 embodiment is just one example of an illustrative embodiment, and the particular arrangement of elements shown in the figure should not be construed as limiting in any way.

One or more illustrative embodiments of the invention advantageously provide mobile application market site assessment techniques that are particularly efficient and easy to implement. For example, these techniques in certain embodiments are "lightweight" in that they generally do not require substantial computational or storage resources for their implementation. This is due at least in part to some embodiments being configured to avoid scanning code of individual applications from a given mobile application market site, but instead assessing the overall health of the given mobile application market site in terms of likelihood that the site is a source for malicious mobile applications.

Accordingly, large numbers of mobile application market sites can be assessed in a relatively short period of time. For example, some embodiments can be utilized to provide a quick risk estimation over an entire application store potentially hosting millions of mobile applications. This is a considerable advantage over conventional approaches that focus on analyzing individual applications by separately scanning their code or that defend against malicious applications from the point of view of a single mobile device, at least in part because these conventional approaches are not readily scalable to large numbers of mobile applications. Moreover, embodiments of the invention can monitor an entire application store externally without any assistance or cooperation from the store owner.

As a result of these and other advantages of illustrative embodiments, a network security system deploying mobile application market site functionality as disclosed herein can provide improved performance and enhanced security.

In addition, embodiments of the invention can be used to complement existing tools for analyzing individual applications. For example, a health score generated for a given mobile application market site could be leveraged by such a tool. Moreover, results provided by an existing application analysis tool could be used to provide at least a portion of the training data used to train a logistic regression model or other type of model used in generating market site health scores.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of network security systems, market sites and market site assessment processes may be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising steps of:

identifying a plurality of mobile application market sites accessible over a network;

extracting features from each of the mobile application market sites;

computing health scores for respective ones of the mobile application market sites based on the corresponding features extracted from those mobile application market sites;

initiating one or more proactive measures to prevent one or more mobile devices from downloading mobile applications from any of the mobile application market sites having computed health scores below a specified threshold;

wherein the extracted features comprise:

site reputation for alternative mobile application market sites of a primary mobile application market site associated with a given mobile device platform; and application information from the primary mobile application market site;

wherein the site reputation for a given one of the alternative mobile application market sites is estimated from one or more of level of incoming web traffic and length of registration period;

wherein the application information from the primary mobile application market site for the given one of the alternative mobile application market sites comprises information identifying mobile applications available from the given alternative mobile application market site that are flagged as problematic on the primary mobile application market site;

wherein computing health scores for respective ones of the mobile application market sites based on the corresponding features extracted from those mobile application market sites comprises:

generating a logistic regression model; and applying the extracted features for a given one of the mobile application market sites to the logistic regression model to generate the health score;

wherein the computed health score for a given one of the mobile application market sites characterizes the given mobile application market site as a whole and does not characterize any particular individual mobile application available from the given mobile application market site;

wherein the mobile application market sites comprise respective mobile application stores; and wherein the steps are performed by at least one processing device comprising a processor coupled to a memory.

2. The method of claim 1 wherein identifying a plurality of mobile application market sites accessible over a network further comprises:

determining the primary mobile application market site associated with the given mobile device platform; and identifying the plurality of mobile application market sites as respective alternative mobile application market sites for the primary mobile application market site associated with the given mobile device platform.

3. The method of claim 1 wherein extracting features from the mobile application market sites comprises extracting the features from a given one of the mobile application market sites without separately scanning code of individual mobile applications available from the given mobile application market site.

4. The method of claim 1 wherein extracting features from the mobile application market sites comprises extracting the features from a given one of the mobile application market sites without requiring cooperation from any owner of the given mobile application market site.

5. The method of claim 1 wherein identifying a plurality of mobile application market sites accessible over a network further comprises:

implementing a search engine crawler to access multiple search engines to determine a set of potential mobile application market sites; and implementing a web page crawler to examine each of the potential mobile application market sites; and identifying at least a portion of the plurality of mobile application market sites as a subset of the potential mobile application market sites based at least in part on outputs generated by the web page crawler.

6. The method of claim 5 wherein the search engine crawler determines the set of potential mobile application market sites at least in part by one or more of:

identifying at least one of the potential mobile application market sites that provides one or more download links for respective files having an application package suffix; and identifying at least one of the potential mobile application market sites having a known application package name in its uniform resource locator.

7. The method of claim 5 wherein the web page crawler examines a given one of the potential mobile application market sites by traversing the given potential mobile application market site to a specified depth to check if one or more application packages are downloaded from the given potential mobile application market site in the course of the traversal to the specified depth.

8. The method of claim 7 wherein said at least one processing device implements the web page crawler to mimic a mobile device so as to facilitate checking for downloading of application packages from any of the potential mobile application market sites that only permit downloading of application packages to mobile devices.

9. The method of claim 1 wherein extracting features from each of the mobile application market sites further comprises extracting features based at least in part on one or more of:

site structure;

application description; and application reviews;

wherein the site structure for a given one of the mobile application market sites is estimated from one or more of number and type of advertisements, number and type of pop-up windows, and amount and type of hidden content;

wherein the application description for a given one of the mobile application market sites is determined by applying natural language processing to descriptions of respective applications available from the given mobile application market site in order to detect the presence of predetermined types of known problematic content; and wherein the application reviews for a given one of the mobile application market sites are analyzed to determine if more than a threshold percentage of the application reviews are fake reviews.

10. The method of claim 1 wherein initiating one or more proactive measures to prevent one or more mobile devices from downloading mobile applications from any of the mobile application market sites having computed health scores below a specified threshold further comprises one or more of:

adding a given mobile application market site having a computed health score below the specified threshold to at least one blacklist;

blocking access to the given mobile application market site;

redirecting mobile device requests from the given mobile application market site to one or more other mobile application market sites having computed health scores at or above the specified threshold; and identifying applications available from the given mobile application market site as malicious applications.

11. A non-transitory processor-readable storage medium having stored therein program code of one or more software programs, wherein the program code when executed by at least one processing device causes said at least one processing device:

to identify a plurality of mobile application market sites accessible over a network;

to extract features from each of the mobile application market sites;

to compute health scores for respective ones of the mobile application market sites based on the corresponding features extracted from those mobile application market sites; and to initiate one or more proactive measures to prevent one or more mobile devices from downloading mobile applications from any of the mobile application market sites having computed health scores below a specified threshold;

wherein the extracted features comprise:

site reputation for alternative mobile application market sites of a primary mobile application market site associated with a given mobile device platform; and application information from the primary mobile application market site;

wherein the site reputation for a given one of the alternative mobile application market sites is estimated from one or more of level of incoming web traffic and length of registration period;

wherein the application information from the primary mobile application market site for the given one of the alternative mobile application market sites comprises information identifying mobile applications available from the given alternative mobile application market site that are flagged as problematic on the primary mobile application market site;

wherein computing health scores for respective ones of the mobile application market sites based on the corresponding features extracted from those mobile application market sites comprises:
generating a logistic regression model; and
applying the extracted features for a given one of the mobile application market sites to the logistic regression model to generate the health score;

wherein the computed health score for a given one of the mobile application market sites characterizes the given mobile application market site as a whole and does not characterize any particular individual mobile application available from the given mobile application market site; and wherein the mobile application market sites comprise respective mobile application stores.

12. The processor-readable storage medium of claim 11 wherein the storage medium comprises at least one of an electronic memory and a storage disk.

13. The processor-readable storage medium of claim 11 wherein the program code when executed by at least one processing device further causes said processing device:
to determine a primary mobile application market site associated with a given mobile device platform; and
to identify the plurality of mobile application market sites as respective alternative mobile application market sites for the primary mobile application market site associated with the given mobile device platform.

14. An apparatus comprising:
at least one processing device comprising a processor coupled to a memory;
said at least one processing device being configured:
to identify a plurality of mobile application market sites accessible over a network;
to extract features from each of the mobile application market sites;
to compute health scores for respective ones of the mobile application market sites based on the corresponding features extracted from those mobile application market sites; and
to initiate one or more proactive measures to prevent one or more mobile devices from downloading mobile applications from any of the mobile application market sites having computed health scores below a specified threshold;
wherein the extracted features comprise:
site reputation for alternative mobile application market sites of a primary mobile application market site associated with a given mobile device platform; and
application information from the primary mobile application market site;
wherein the site reputation for a given one of the alternative mobile application market sites is estimated from one or more of level of incoming web traffic and length of registration period;

wherein the application information from the primary mobile application market site for the given one of the alternative mobile application market sites comprises information identifying mobile applications available from the given alternative mobile application market site that are flagged as problematic on the primary mobile application market site;

wherein computing health scores for respective ones of the mobile application market sites based on the corresponding features extracted from those mobile application market sites comprises:
generating a logistic regression model; and
applying the extracted features for a given one of the mobile application market sites to the logistic regression model to generate the health score;

wherein the computed health score for a given one of the mobile application market sites characterizes the given mobile application market site as a whole and does not characterize any particular individual mobile application available from the given mobile application market site; and wherein the mobile application market sites comprise respective mobile application stores.

15. The apparatus of claim 14 wherein said at least one processing device is further configured:
to implement a search engine crawler to access multiple search engines to determine a set of potential mobile application market sites; and
to implement a web page crawler to examine each of the potential mobile application market sites;
wherein at least a portion of the plurality of mobile application market sites are identified as a subset of the potential mobile application market sites based at least in part on outputs generated by the web page crawler.

16. The apparatus of claim 15 wherein the search engine crawler determines the set of potential mobile application market sites at least in part by one or more of:
identifying at least one of the potential mobile application market sites that provides one or more download links for respective files having an application package suffix; and
identifying at least one of the potential mobile application market sites having a known application package name in its uniform resource locator.

17. The apparatus of claim 15 wherein the web page crawler examines a given one of the potential mobile application market sites by traversing the given potential mobile application market site to a specified depth to check if one or more application packages are downloaded from the given potential mobile application market site in the course of the traversal to the specified depth.

18. The apparatus of claim 14 wherein extracting features from each of the mobile application market sites further comprises extracting features based at least in part on one or more of:
site structure;
application description; and
application reviews;
wherein the site structure for a given one of the mobile application market sites is estimated from one or more of number and type of advertisements, number and type of pop-up windows, and amount and type of hidden content;
wherein the application description for a given one of the mobile application market sites is determined by applying natural language processing to descriptions of respective applications available from the given mobile application market site in order to detect the presence of predetermined types of known problematic content; and wherein the application reviews for a given one of the mobile application market sites are analyzed to determine if more than a threshold percentage of the application reviews are fake reviews.

19. The apparatus of claim 14 wherein to identify a plurality of mobile application market sites accessible over a network further comprises:

determining the primary mobile application market site associated with the given mobile device platform; and identifying the plurality of mobile application market sites as respective alternative mobile application market sites for the primary mobile application market site associated with the given mobile device platform.

20. The apparatus of claim 14 wherein to extract features from the mobile application market sites comprises extracting the features from a given one of the mobile application market sites without separately scanning code of individual mobile applications available from the given mobile application market site.

\* \* \* \* \*